United States Patent [19]

Iwasaki et al.

[11] Patent Number: 4,709,578
[45] Date of Patent: Dec. 1, 1987

[54] METHOD AND APPARATUS FOR DETERMINATING A VACUUM DEGREE WITHIN A FLEXIBLE VACUUM PACKAGE

[75] Inventors: Tadayoshi Iwasaki, Fujisawa; Keiki Ariga, Yokohama; Makoto Sato, Yokosuka, all of Japan

[73] Assignee: Nippon Sanso Kabushiki Kaisha, Tokyo, Japan

[21] Appl. No.: 792,397

[22] Filed: Oct. 29, 1985

[30] Foreign Application Priority Data

Oct. 30, 1984 [JP] Japan .................. 59-228367

[51] Int. Cl.$^4$ ............................. G01M 3/36
[52] U.S. Cl. ............................. 73/49.3; 73/52
[58] Field of Search .............. 73/52, 49.2, 49.3, 37

[56] References Cited

U.S. PATENT DOCUMENTS

| | | | |
|---|---|---|---|
| 1,974,026 | 9/1934 | Hicks | 73/49.3 |
| 2,648,977 | 8/1953 | Mills | 73/52 |
| 3,117,441 | 1/1964 | Zimmerman | 73/52 |
| 3,667,281 | 6/1972 | Pfeifer | 73/37 |
| 3,859,844 | 1/1975 | Hruby | 73/49.3 |
| 4,188,819 | 2/1980 | Egee et al. | 73/49.3 |
| 4,478,070 | 10/1984 | Clifford et al. | 73/49.3 |

FOREIGN PATENT DOCUMENTS

| | | | |
|---|---|---|---|
| 2351400 | 3/1976 | France | 73/49.3 |
| 7810210 | 4/1980 | Netherlands | 73/52 |
| 2059381 | 4/1981 | United Kingdom | |

Primary Examiner—Stewart J. Levy
Assistant Examiner—Hezron E. Williams
Attorney, Agent, or Firm—Armstrong, Nikaido, Marmelstein & Kubovcik

[57] ABSTRACT

Method and apparatus for determining a vacuum degree of a flexible vacuum package. The vacuum package is sealingly placed within a vacuum chamber and then the vacuum chamber is evacuated to a vacuum degree below the vacuum degree of the vacuum package placed within the vacuum chamber. A start of inflation of the package is detected during the evacuation step and pressure within the vacuum chamber is measured when the start of the inflation of the package is detected.

3 Claims, 3 Drawing Figures

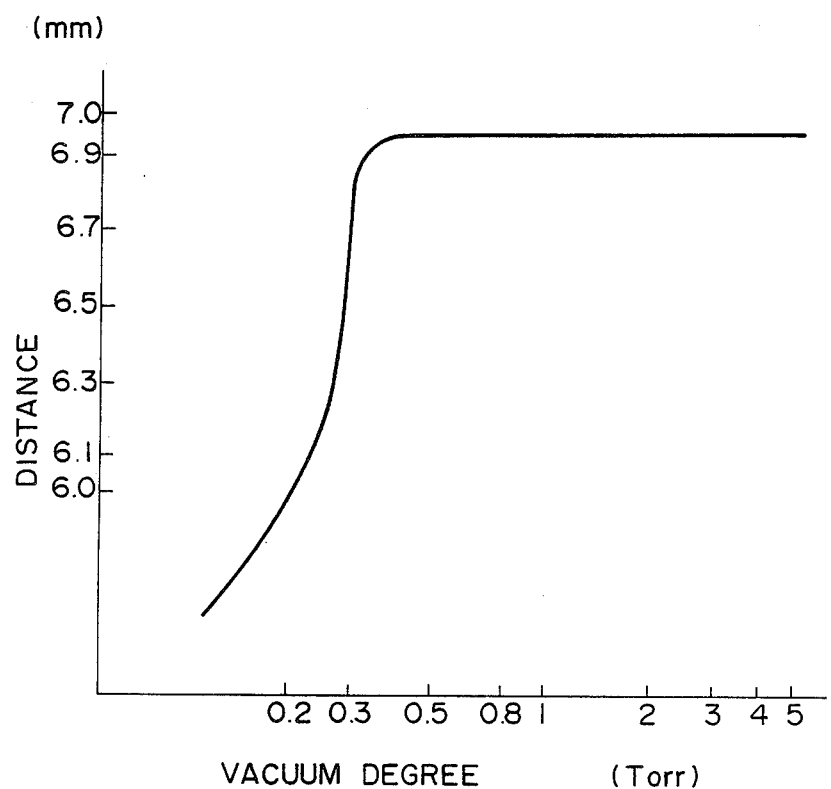

METHOD AND APPARATUS FOR DETERMINATING A VACUUM DEGREE WITHIN A FLEXIBLE VACUUM PACKAGE

BACKGROUND OF THE INVENTION

The present invention relates to a method and apparatus for determining a vacuum degree within a flexible vacuum package containing a material in a vacuum state.

The evacuated heat insulation panel having a flexible covering plastic film bag, hereinafter referred to as PIP, is used in, for example, a heat insulation panel in the wall of a refrigerator and is produced as follows. An amount of a powder such as calcium silicate is charged into a metal deposited film laminate bag, which is then placed within a vacuum packer with its inlet opened. The vacuum packer is thereafter evacuated to a predetermined pressure at which the inlet of the bag is heat sealed. After the heat sealing, the PIP thus produced is subjected to a heat insulation test. The heat insulation test is carried out by means of a heat flow meter or a thermometer. This test is disadvantageous in that it takes a rather long period of time. This is due to the following reasons. Firstly, it takes time for the heat flow to become in a steady state due to a small thermal conductivity. Secondly, this test requires many data to be measured such as weight and size. Lastly, it is laborious to set a heat flow meter sensor and a cold terminal thereof.

As is well known, the degree of vacuum within the PIP is inevitably deteriorated with the lapse of time and thus the life of the PIP depends on this deterioration in vacuum degree. In practice, the amount of buildup or deterioration of vacuum is determined by measuring the degree of vacuum within the PIP twice and thereby the life thereof can be estimated. It is hard to predict the life of the product only by the widely-used heat insulation test using a heat flow meter.

It is also known that below a certain degree of vacuum the thermal conductivity of the PIP is constant. The determination of the vacuum degree of the PIP hence makes it possible to estimate both the heat-insulative property and the life of the PIP but measurement of these properties according to the prior art method is laborious and time consuming. Although the degree of vacuum of the PIP is determined by applying the conventional vacuum degree determination device to the PIP, this device considerably increases the equipment cost and may cause a leakage of the PIP. When the vacuum degree determination device is not available, the only method for determining degree of vacuum of the PIP is to break package of the PIP for the test.

SUMMARY OF THE INVENTION

Accordingly, it is an object of the present invention to provide a method and apparatus for determining a vacuum degree within a flexible vacuum package packaging a material in a vacuum manner. The method and apparatus determine the degree of vacuum within the flexible vacuum package in an easy and exact manner in a relatively short time without breaking the package.

With these and other objects in view, one aspect of the present invention is directed to a method for determining a vacuum degree of a flexible vacuum package containing a material in a vacuum state. The vacuum package is sealingly placed within a vacuum chamber and then the vacuum chamber is evacuated to a vacuum degree below the vacuum degree of the vacuum package placed within the vacuum chamber. A start of inflation of the package is detected during the evacuation step and pressure within the vacuum chamber is measured when the start of the inflation of the package is detected.

Another aspect of the present invention is directed to an apparatus for determining a vacuum degree within a flexible vacuum package containing a material. The apparatus includes: a vacuum chamber adapted to sealingly receive the vacuum package; an evacuating mechanism for evacuating the interior of the vacuum chamber; an inflation detection mechanism, mounted to the vacuum chamber, for detecting a start of inflation of the vacuum package while the vacuum chamber is evacuated by the evacuating mechanism to a vacuum degree below the vacuum degree of the vacuum package; and a pressure detection mechanism, mounted to the vacuum chamber, for detecting pressure within the vacuum chamber.

BRIEF DESCRIPTION OF THE DRAWINGS

In the drawings:

FIG. 3 is a graph illustrating the relation between the degree of vacuum within the vacuum chamber in FIG. 1 and the distance of an upper portion of the PIP, which is placed within the vacuum chamber, from a lower end of the ultrasonic position transducer as the vacuum chamber is evacuated.

DETAILED DESCRIPTION OF THE PREFERRED EMBODIMENT

Figure 1:
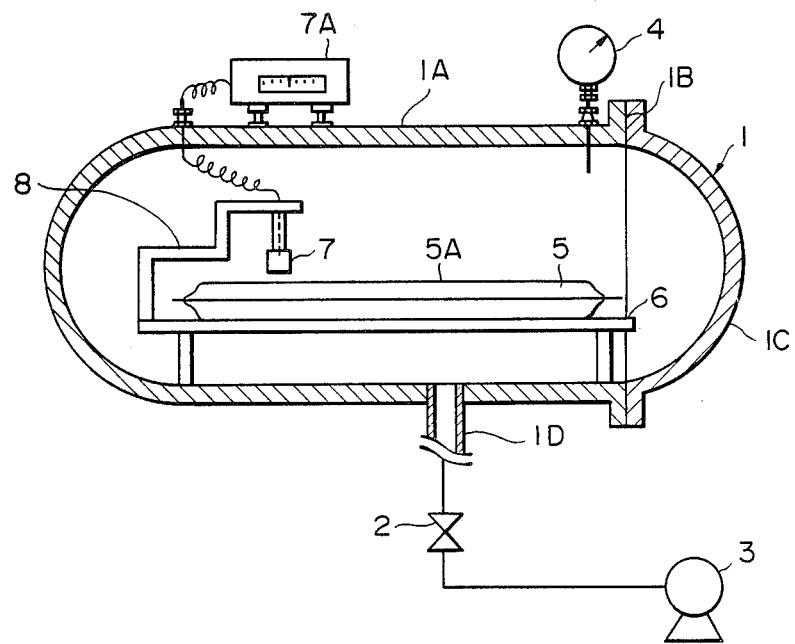
FIG. 1 is a side view, partly in section, of a vacuum degree determining apparatus according to the present invention.
Figure 2:
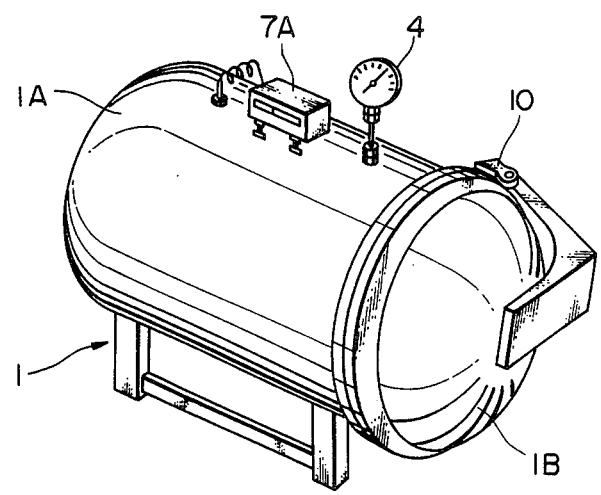
FIG. 2 is a perspective view of the vacuum determining apparatus in FIG. 1 with a modified scale.

Referring to FIGS. 1 and 2, the reference numeral 1 designates a vacuum chamber 1 including a chamber body 1A having an open end 1B and a closure member 1C hinged to the open end 1B of the chamber body 1A by means of a door hinge 10 so that it may, as shown in FIG. 1, close the open end 1B in a sealing manner by means of an O-ring not shown. The chamber body 1A has an exhaust port 1D formed at its bottom. The exhaust port 1D is communicated to a rotary vacuum pump 3 through a valve 2 for evacuating the interior of the vacuum chamber 1. The vacuum chamber 1 has a vacuum gage 4 mounted to the chamber body 1A for determining the pressure of the interior thereof and is provided on its inner bottom with a bed 6 for resting a PIP 5 to be tested on it. An ultrasonic position transducer 7 is mounted on a support member 8, which is fixed to the bed 6, so that it is located above the PIP 5 may be tested for determining variations in the distance of an upper portion of the outer face of the PIP 5 from the lower end of the position transducer 7. Detected signals from the transducer 7 are transmitted to a distance indicator 7A mounted on the outside of the chamber body 1A of the vacuum chamber 1.

In order to determine the degree of vacuum of the PIP 5, the closure member 1 is opened by turning it about a vertical axis of the door hinge 10 and the closure member 1 is then sealingly closed after the PIP 5 is placed on a bed 6 of the vacuum chamber 1. Thereafter, the valve 2 is opened and the vacuum chamber 1 is then evacuated by actuating the rotary pump 3. When the interior of the vacuum chamber 1 reaches to a pressure below the pressure within the flexible bag 5A of the PIP 5, the bag 5A begins to be inflated. The start of this change in shape of the bag 5A is detected by the position indicator 7A and at the same time the pressure within the chamber 1 is detected by the pressure gauge 4. By the use of average value of these detected pressure values, the vacuum degree within the plastic insulation plate 5 can be calculated. More specifically, the exact vacuum degree of a PIP 5 is previously determined by a preliminary puncture test. An average error is obtained by the difference between the exact vacuum degree of the PIP 5 and the average pressure value obtained by applying the apparatus to several PIPs 5. Thus, fairly exact vacuum degree within a PIP 5 is obtained by subtracting the average error from the pressure value within the vacuum chamber 1 detected when the PIP begins to be inflated. This calculation of the vacuum degree of the PIP 5 may be conventionally processed by inputting data which have been output from both the position transducer 7 and the pressure gauge 4 into a computer system and by subtracting the average error data already input from the pressure value.

More than one bed 5 may be vertically stacked to support a plurality of PIPs 5 on them for determining vacuum degrees thereof, in which case the equal number of position transducers 7A are provided. The supporting bed 6 is not necessarily provided and the PIP 5 may be directly placed on the bottom of the vacuum chamber body 1A for the measuring, in which case care must be taken that the PIP 5 may not close the exhaust port 1D.

In place of the ultrasonic position transducer 7A, other conventional detectors such as a photoelectric cell may be used for detecting deformation or displacement of the flexible vacuum bag 5A of the PIP 5. The deformation or displacement of the bag 5A can be detected by sensing a change in reflection angle of light emitted from a detector, such a photoelectric cell unit, against the bag 5A. This deformation can be also detected by sensing changes in length of each side of the bag 5A or tension applied to the bag in a conventional manner.

Although the present invention is illustrated with respect to the PIP, it is should be understood that the present invention is applicable to determine the degree of vacuum of a flexible vacuum package containing, for example, a food.

EXAMPLE

A PIP using a heat sealed laminated bag 400 mm wide and 400 mm long was used. The pressure of the inside of the heat sealed bag was about 0.35 Torr and the bag was a laminated bag consisting of a 12 μm outermost polyethylene terephthalate layer, a 9 μm aluminum foil bonded to the inner face of the outermost polyethylene terephthalate layer, a 12 μm intermediate polyethylene terephthalate layer bonded at its one face to the aluminum layer and having 500 Å aluminum film vapour deposited on the other face and a 60 μm innermost polyethylene layer heat sealed to the aluminum film. The PIP was placed within the apparatus illustrated in FIG. 1 and then the vacuum chamber 1 was evacuated. In FIG. 3, there are plotted variations in the distance of an upper portion of the PIP, which portion was just below the ultrasonic position sensor 7, from the lower end of the sensor as the vacuum chamber 1 is evacuated. It was clearly noted that the laminated bag began to be inflated at a pressure of about 0.35 Torr. Thus, it was calculated that the inner pressure of the laminated bag was about 0.36 Torr since the average error was 0.01 Torr.

What is claimed is:

1. A method for determining a vacuum degree within a flexible vacuum package containing a material in a vacuum state, comprising the steps of:
   sealingly placing the vacuum package within a vacuum chamber;
   evacuating the vacuum chamber to a degree below the vacuum degree of the vacuum package sealingly placed within the vacuum chamber;
   detecting a start of displacement of a part of the package during the evacuation step;
   measuring pressure within the vacuum chamber when the start of displacement of the part of the package is detected, and
   calculating the pressure within said vacuum package based upon the detected start of displacement of the part of the package during the evacuation step and the measured pressure within the chamber.

2. A method as recited in claim 1, wherein the placing step comprises substantially horizontally placing the vacuum package within the vacuum chamber and wherein vertical displacement of the part of the package is detected.

3. A method as recited in claim 2, wherein the vacuum package is substantially horizontally placed on a supporting member mounted within the vacuum chamber and wherein vertical displacement of an upper portion of the vacuum package is detected during the evacuation step.

* * * * *